(12) United States Patent
Corbin

(10) Patent No.: US 8,079,786 B2
(45) Date of Patent: Dec. 20, 2011

(54) TOOL INSERT BLANKS AND METHOD OF MANUFACTURE

(75) Inventor: Lawrence W. Corbin, Fort Wayne, IN (US)

(73) Assignee: Corbin Manufacturing, Inc., Fort Wayne, IN (US)

( * ) Notice: Subject to any disclaimer, the term of this patent is extended or adjusted under 35 U.S.C. 154(b) by 479 days.

(21) Appl. No.: 12/386,747

(22) Filed: Apr. 22, 2009

(65) Prior Publication Data

US 2010/0272525 A1    Oct. 28, 2010

(51) Int. Cl.
   *B23B 27/16*    (2006.01)
   *B26D 3/00*     (2006.01)
(52) U.S. Cl. .................. 407/113; 407/118; 407/119
(58) Field of Classification Search ............ 407/113, 407/118, 119; 29/411, 412; 428/698, 697, 428/701
   See application file for complete search history.

(56) References Cited

U.S. PATENT DOCUMENTS

| 4,340,350 A * | 7/1982 | Springborn ............... 425/409 |
| 4,525,179 A * | 6/1985 | Gigl ................... 51/309 |
| 4,797,138 A | 1/1989 | Komanduri |
| 4,911,254 A | 3/1990 | Keith |
| 5,026,960 A | 6/1991 | Slutz et al. |
| 5,345,846 A * | 9/1994 | Somma ..................... 82/13 |
| 5,429,199 A | 7/1995 | Sheirer et al. |
| 5,853,268 A | 12/1998 | Simpson |
| 6,100,494 A * | 8/2000 | Nolan ................. 219/69.17 |
| 6,155,755 A * | 12/2000 | Kanada et al. .............. 407/118 |
| 6,224,299 B1 * | 5/2001 | Frecska et al. ............ 407/41 |
| 6,705,806 B2 | 3/2004 | Okamura et al. |
| 6,846,341 B2 | 1/2005 | Middlemiss |
| 7,179,022 B2 | 2/2007 | Okamura et al. |
| 7,322,776 B2 | 1/2008 | Webb et al. |
| 7,585,342 B2 * | 9/2009 | Cho ..................... 51/309 |
| 2004/0234349 A1 | 11/2004 | Ueda |

FOREIGN PATENT DOCUMENTS

WO    WO 2005/068129 A1    7/2005

* cited by examiner

*Primary Examiner* — Will Fridie, Jr.
(74) *Attorney, Agent, or Firm* — George Pappas

(57) ABSTRACT

A tool insert blank including first and second major surfaces and a plurality of edge surfaces defining an outer perimeter of the blank. A first layer defines the first major surface and a first portion of the plurality of edge surfaces proximate the first major surface. A second layer harder than the first layer is disposed substantially co-extensive with the second major surface and a second portion of the plurality of edge surfaces proximate the second major surface. At least one of the edge surfaces includes a projecting portion defining a first engagement plane and a recessed portion spaced inwardly of the engagement plane whereby the grinding wheel is engageable with the projecting portion without engaging the recessed portion. The second layer can be formed out of various materials including polycrystalline diamond and cubic boron nitride materials. A method of forming a tool insert blank is also disclosed.

20 Claims, 3 Drawing Sheets

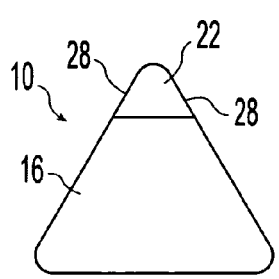
Fig. 1
(Prior Art)
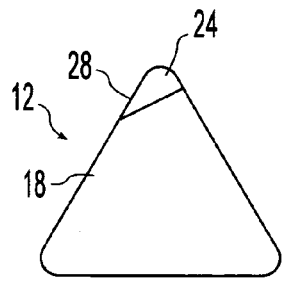
Fig. 2
(Prior Art)
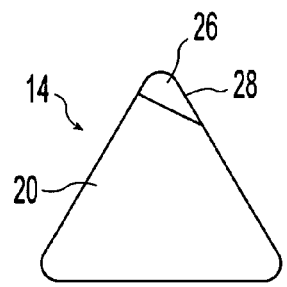
Fig. 3
(Prior Art)
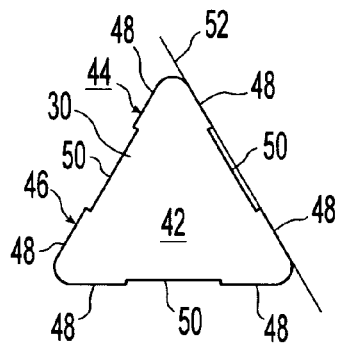
Fig. 4
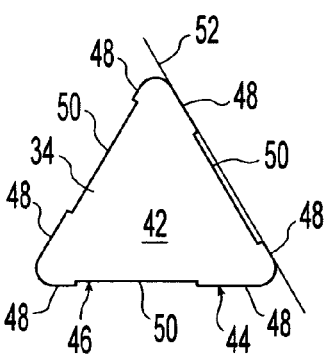
Fig. 5
Fig. 6
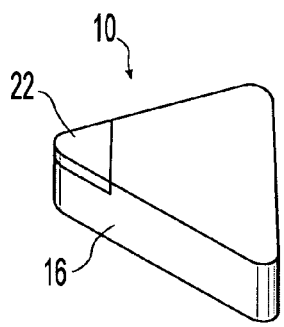
Fig. 1A
(Prior Art)
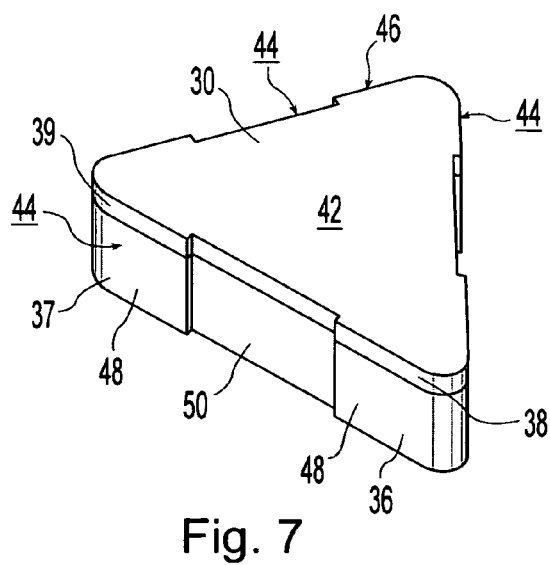
Fig. 7

TOOL INSERT BLANKS AND METHOD OF MANUFACTURE

BACKGROUND OF THE INVENTION

1. Field of the Invention

The present invention relates to tool inserts such as a cutting insert used in machining operations, blanks for forming such tool inserts and a method of manufacture.

2. Description of the Related Art

Machining methods such as turning or milling require the use of cutting tools made from hard materials. Cemented tungsten carbide was developed many decades ago as a much harder alternative to steel. Cemented tungsten carbide may be brazed to a steel shank but it is more commonly employed as an "insert" that is attached to tool holder by clamping or by engaging a screw with a hole in the insert. Such inserts have an appropriate thickness and are provided in a variety of different geometries. Some of the more common insert geometries are triangular, square and rhombic inserts.

More recently, polycrystalline cubic boron nitride (PCBN) and polycrystalline diamond (PCD) materials have been used with inserts to provide a harder and more wear resistant alternative. Typically, small sections of PCBN or PCD are cut with a laser or electrical discharge machining (EDM) process and the small sections of PCBN or PCD are then brazed into a corresponding pocket in a cemented tungsten carbide insert. FIGS. 1-3 illustrate prior art inserts 10, 12 and 14 having a carbide body 16, 18, 20 and an inlayed section 22, 24, 26 formed out of either PCBN or PCD that has been secured in a pocket formed in the carbide body. The inlayed sections of PCBN or PCD form one or more cutting edges 28 on the insert. FIG. 1A which provides a perspective view of insert 10 with its inlayed section 22 secured to carbide body 16.

The process of manufacturing an insert typically involves forming an insert blank that has the desired geometry but which is slightly larger than the desired final dimensions of the cutting insert. The insert blank is then ground, using a diamond grit wheel, to remove the excess material and form the cutting edge of the insert. While this does not present undue problems with insets having a PCBN cutting edge, the grinding time and grinding wheel consumption involved in grinding a PCD cutting edge presents a significant expense. An improved tool insert blank and manufacturing method that allows for the more cost-effective production of tool inserts is desirable.

SUMMARY OF THE INVENTION

The present invention provides tool insert blanks and methods of manufacturing tool insert blanks having a relatively hard layer, e.g., PCBN or PCD, that can be cost-effectively ground to form a tool insert.

The invention comprises, in one form thereof, a tool insert blank workable with a grinding wheel. The tool insert blank includes first and second major surfaces defining opposing sides of the blank and a plurality of edge surfaces defining an outer perimeter of the blank extending between the first and second major surfaces. A first layer defines the first major surface and a first portion of the plurality of edge surfaces proximate the first major surface. A second layer harder than the first layer is disposed substantially co-extensive with the second major surface and a second portion of the plurality of edge surfaces proximate the second major surface. At least one of the edge surfaces includes a projecting portion defining a first engagement plane and a recessed portion spaced inwardly of the engagement plane whereby the grinding wheel is engageable with the projecting portion without engaging the recessed portion.

The second layer can be formed out of various materials including polycrystalline diamond and cubic boron nitride materials.

The invention comprises, in another form thereof, a method of forming a tool insert blank. The method includes providing a multi-layered body having first and second major surfaces defining opposing sides of the body. The body includes a first layer defining the first major surface and a second layer. The second layer is harder than the first layer. A tool insert blank is cut from the body wherein the resulting blank has a first side defined by the first major surface, a second side defined by the second major surface and a second layer portion that is substantially co-extensive with the second side. The tool insert blank also includes a plurality of edge surfaces extending between the first and second sides of the blank. The plurality of edge surfaces define an outer perimeter of the tool blank. At least one of the edge surfaces includes a projecting portion defining a first engagement plane and a recessed portion spaced inwardly of the engagement plane whereby a grinding wheel is engageable with the projecting portion without engaging the recessed portion.

The step of cutting the tool insert blank from the body can be performed using a wire discharge machining process. The plurality of edge surfaces can be cut to form a substantially perpendicular angle with the first and second major surfaces or the edge surfaces can be cut to define non-perpendicular angle with the first and second major surfaces.

The invention comprises, in yet another form thereof, a method of forming a tool insert blank. The method includes providing a multi-layered body having first and second major surfaces defining opposing sides of the body. The body includes a first layer defining the first major surface and a second layer harder than the first layer. The method includes cutting a tool insert blank from the body wherein the resulting blank has a first side defined by the first major surface, a second side defined by the second major surface and a plurality of edge surfaces extending between the first and second sides of the blank. The plurality of edge surfaces define an outer perimeter of the tool blank and at least one of the edge surfaces includes a projecting portion defining a first engagement plane and a recessed portion spaced inwardly of the engagement plane whereby a grinding wheel is engageable with the projecting portion without engaging the recessed portion. The cutting of the recessed portion includes removing a portion of the second layer.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein:

FIG. 1 is a top view of a prior art insert blank with a carbide body and an inlayed cutting tip.

FIG. 1A is a perspective view of the prior art insert blank of FIG. 1.

FIG. 2 is a top view of another prior art insert blank with a carbide body and an inlayed cutting tip.

FIG. 3 is a top view of another prior art insert blank with a carbide body and an inlayed cutting tip.

FIG. 4 is a top view of an insert blank in accordance with the present invention.

FIG. 5 is a top view of another insert blank in accordance with the present invention.

FIG. 6 is a top view of another insert blank in accordance with the present invention.

FIG. 7 is a perspective view of the insert blank of FIG. 4.

Figure 8:
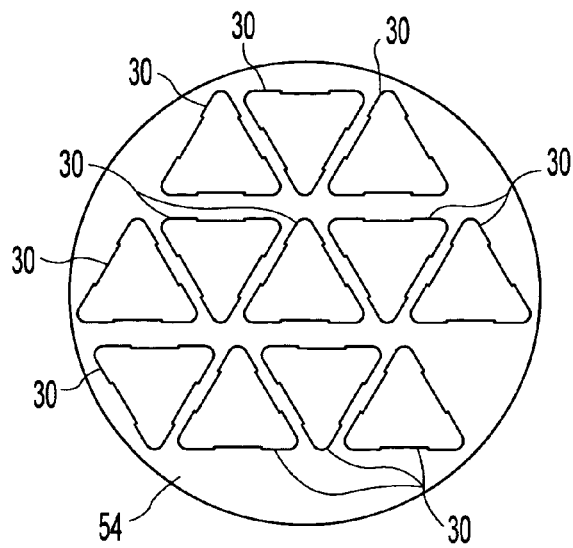
FIG. 8 is a top view of a disk showing a cutting pattern for cutting insert blanks from the disk.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE INVENTION

Three slightly different configurations of insert blanks 30, 32, 34 in accordance with the present invention are illustrated in FIGS. 4-6. Each of the blanks 30, 32, 34 includes a base layer 36 and a relatively harder layer 38. In the illustrated blanks, 30, 32, 34, base layer 36 is a cemented tungsten carbide layer and harder layer 38 is formed out of a PCD material. Other suitable materials may also be used to form layers 36, 38. For example, a PCBN material can be used to form the relatively harder layer 38. The base layer 36 and hard layer 38 of insert blank 30 are best seen in FIG. 7.

Two opposing sides of insert blanks 30, 32, 34 are defined by major surfaces 40, 42. In the illustrated embodiments, major surface 40 is formed by base layer 36 and major surface 42 is formed by hard layer 38 with both of the layers being oriented parallel with major surfaces 40, 42. A plurality of edge surfaces 44 extend between the two opposing major surfaces 40, 42 and define an outer perimeter 46 of the insert blanks.

Edge surfaces 44 include projecting portions 48 and recessed portions 50. When the insert blanks are ground to their final dimensions using a grinding wheel, the grinding wheel will engage the projecting portions 48 but will not engage the recessed portions 50. This is schematically depicted in FIGS. 4-6 which include a line 52 schematically depicting an engagement plane oriented substantially perpendicular to major surfaces 40, 42 and substantially parallel with the engaged edge. As can be seen in these Figures, engagement plane 52 will first encounter projecting portions 48 when the engagement plane is brought into contact with an edge surface 44 of the insert blank and recessed portion 50 will be spaced inwardly of the engagement plane.

Hard layer 38 provides a cutting edge after the insert blanks have been ground to their final dimensions and installed in a piece of machining equipment. As can be seen in FIG. 7, base layer 36 forms a first portion 37 of edge surface 44 proximate major surface 40 while hard layer 38 forms a second portion 39 of edge surface 44 proximate major surface 42. Hard layer 38 is co-extensive with second major surface 42, i.e., it has an extent that is substantially equivalent to outer perimeter 46.

Both the projecting portions 48 and the recessed portions 50 of edge surfaces 44 have a first portion 37 formed by base layer 36 and a second portion 39 formed by hard layer 38. However, it is the portion 39 of hard layer 38 on projecting portions 48 that will act as a cutting edge after the grinding of the insert blank has been completed.

By providing a recessed portion 50 on the edge surfaces 44, the grinding operation will only have to remove material from the projecting portions 44 of the insert blanks. This reduction in the quantity of material that must be removed from the insert blank during the grinding will reduce costs. The grinding of base layer 36 generally does not present a difficulty and it is the removal of a portion of layer 38 to form recessed portion 50 during the cutting of the insert blank that presents the greatest reduction in grinding expenses. This is cost savings is particularly beneficial with insert blanks having a layer 38 formed out of a PCD material.

Figure 12:
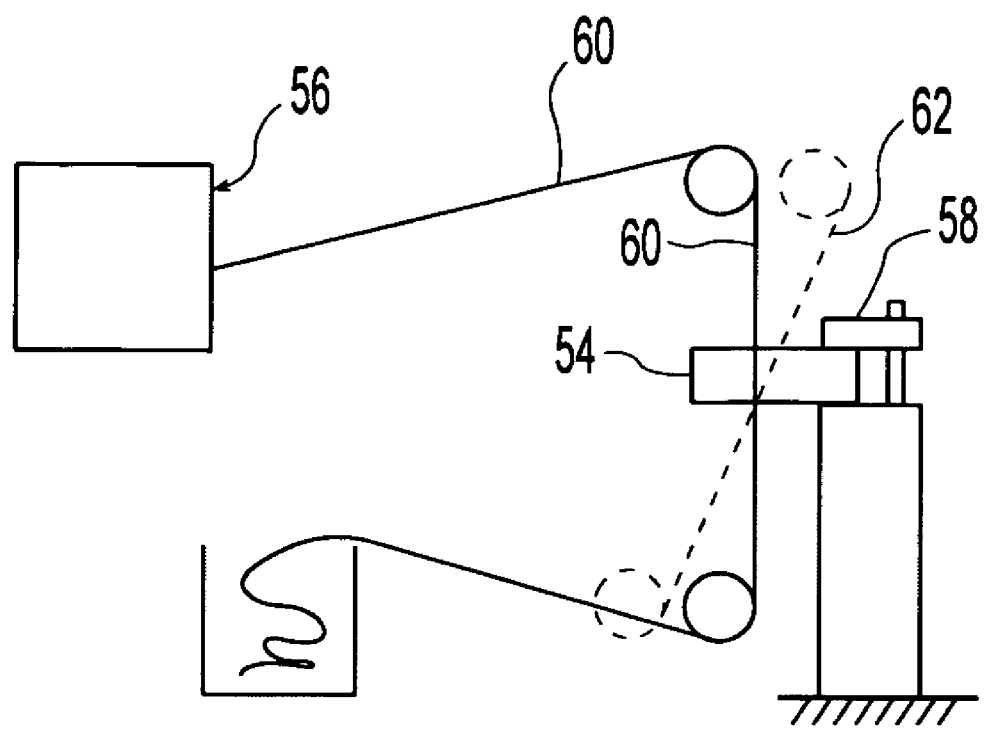
FIG. 12 schematically depicts the cutting of an insert blank from a disk using a wire EDM process.

FIG. 8 illustrates a disk 54 from which multiple insert blanks 30 are cut. Disk 54 is shown in cross section in FIG. 9 and has a base layer 36 formed out of carbide or other suitable material with a layer 38 of harder material, e.g., PCBN or PCD, deposited on the base layer 36. FIG. 8 shows the outline of several insert blanks 30 that will be cut from the body of disk 54. Insert blanks 30 can be cut from disk body 54 using various techniques including laser cutting methods and electrical discharge machining. FIG. 12 schematically depicts the use of a wire electrical discharge machining apparatus 56 to cut insert blanks from disk 54. A clamping device 58 holds disk 54 while a wire 60 of apparatus 56 is used in the cutting of process.

Laminated disks 54 having a carbide layer 36 and a PCD layer 38 are commercially available and can be obtained with layers 36, 38 of various dimensions. For example, disks 54 commonly have a total thickness of approximately 1.6 mm, 3.2 mm or 4.8 mm with a PCD layer 38 having an approximate thickness of 0.5 mm to 0.8 mm. Although the illustrated insert blanks 30, 32, 34 have two parallel layers which are both parallel and co-extensive with the major surfaces 40, 42, other configurations, e.g., insert blanks having three or more layers, may also be employed with the present invention.

Figures 11A, 11B:
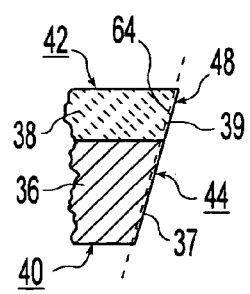
FIG. 11A is a cross sectional view along line 11-11 of FIG. 10 of an insert blank having perpendicularly oriented edge surfaces.
FIG. 11B is a cross sectional view along line 11-11 of FIG. 10 of an alternative insert blank having non-perpendicularly oriented edge surfaces.

The wire of the apparatus 56 is shown in two alternative positions in FIG. 12. The solid line wire 60 indicates the relative orientation of wire 60 to disk 54 for cutting edge surfaces 44 that are disposed at a substantially perpendicular angle to major surfaces 40, 42 as depicted in FIG. 11A. Dashed lines 62 in FIG. 12 indicate an alternative orientation of the wire which results in edge surfaces 44 that are positioned at a non-perpendicular angle relative to major surfaces 40, 42 as depicted in FIG. 11B. Various methods can be used to cut insert blanks from a larger body, however, the use of a wire EDM process to cut insert blanks from a larger body is particularly advantageous in the manufacture of insert blanks which include edge surfaces 44 that are oriented at a non-perpendicular angle relative to major surfaces 40, 42.

Figure 10:
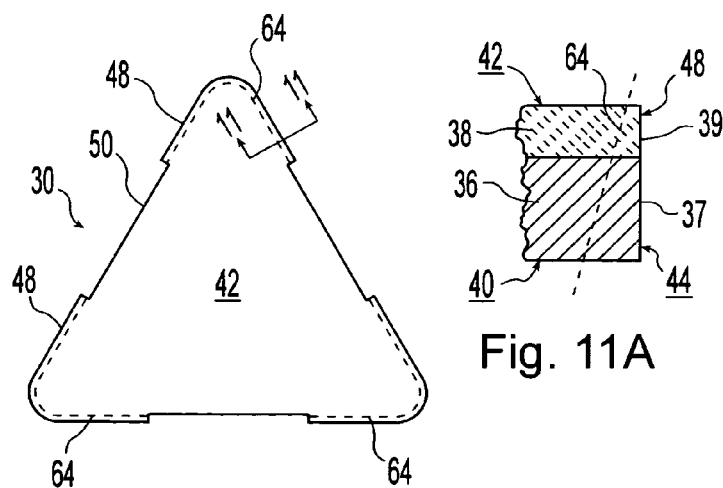
FIG. 10 is a top view of an insert blank schematically depicting where the edges will be ground to form a cutting tool insert.

The provision of inclined edge surfaces as depicted in FIG. 11B further reduces the quantity of material that must be removed during the grinding process to provide additional cost savings in the grinding process. As mentioned above, insert blanks must be finished with a grinding wheel or other suitable tool to provide a finished surface that corresponds to the desired final dimensions of a cutting insert. In FIGS. 10, 11A and 11B, dashed lines 64 indicate the location of the finished surface corresponding to the desired final dimensions of the cutting insert that will be created using the insert blank.

As can be seen in FIGS. 11A and 11B, finished surface location 64 is disposed at a non-perpendicular angle relative to major surfaces 40, 42. When edge surface 44 forms a non-perpendicular angle that is more closely parallel to the desired final surface 64 than a perpendicularly oriented edge surface, the quantity of material that must be removed from insert blank 30 during the finishing operation can be reduced compared to the use of an edge surface 44 that is perpendicular to both major surfaces 40, 42. Because it is the projecting portions 48 that will be subjected to finishing operations to obtain the desired finished surfaces 64, recessed portions 50 can be formed by surfaces which are oriented at a perpendicular angle to major surfaces 40, 42 without affecting the quantity of material that must be removed during finishing operations. It is also noted that for some insert blanks, the desired finished surface is perpendicular to major surfaces 40, 42. In such cases, an edge surface 44 that forms a perpendicular angle with major surfaces 40, 42 will minimize the quantity of material that must be removed during the finishing operation.

It is further noted that while the depicted finished surface location 64 does not require any material to be removed from edge surface 44 in recessed portions 50 alternative embodiments may employ relatively shallower recessed portions. For example, if the recessed portions 50 have a depth, relative to projecting portions 48, that is only slightly less than the quantity of material removed from projecting portions 48 during the grinding or finishing operations, only a minimal amount of material will have to be removed from recessed portions 50. The use of such "shallow" recessed portions 50 still reduces the quantity of material that must be removed during the grinding or finishing operation while allowing the recessed portion 50 to be cosmetically improved by the grinding/finishing operations and providing finished edge surfaces without a discontinuity or step at the transition between the projecting and recessed portions 48, 50.

Figure 9:
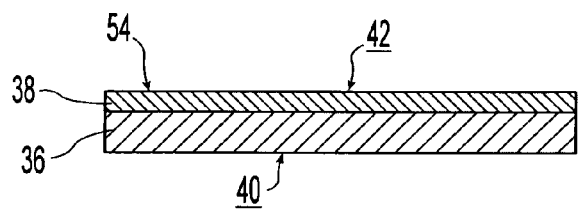
FIG. 9 is a side view of the disk.

While FIGS. 8 and 9 illustrate a disk 54 from which a plurality of insert blanks 30 can be cut, insert blanks in accordance with the present invention can also be manufactured using other starting materials. For example, used cutting tool inserts having suitable overall dimensions can be reclaimed and cut to form a new insert blank.

Insert blanks having projecting and recessed portions 48, 50 are not limited to any particular outer perimeter geometry. Although the illustrated insert blanks 30, 32, 34, all have a substantially triangular outer perimeter 46, alternatively shaped outer perimeters, e.g., square, diamond and other rhombic outer perimeters, can also be used. Numerous other regular and irregular polygon shaped outer perimeters are in common usage with insert blanks and may also be employed with the insert blanks of the present invention.

The use of insert blanks having projecting and recessed portions 48, 50 to replace alternative insert blank designs can be appreciated with reference to FIGS. 1-6. In this set of six figures, FIGS. 1-3 illustrate prior art insert blanks wherein the hardened inlay forms three separate cutting edge patterns 28. FIGS. 4-6 illustrate insert blanks with projecting and recessed portions 48, 50 that provide cutting edge patterns that not only replicate those of FIGS. 1-3 respectively but also provide the cutting pattern on each of the three corners of the insert blanks. It is also noted that as a result of this configuration, each of the insert blanks illustrated in FIGS. 4-6 include three side edges 44 with each of the side edges 44 including a first projecting portion 48 at one end, a second projecting portion 48 at the opposite end of the edge 44 and a recessed portion 50 disposed between the two projecting portions 48.

While this invention has been described as having an exemplary design, the present invention may be further modified within the spirit and scope of this disclosure. This application is therefore intended to cover any variations, uses, or adaptations of the invention using its general principles.

What is claimed is:

1. A tool insert blank workable with a grinding wheel, said tool insert blank comprising:
   first and second major surfaces defining opposing sides of said blank and a plurality of edge surfaces defining an outer perimeter of said blank extending between said first and second major surfaces;
   a first layer defining said first major surface and a first portion of said plurality of edge surfaces proximate said first major surface;
   a second layer harder than said first layer, said second layer being disposed substantially co-extensive with said second major surface and a second portion of said plurality of edge surfaces proximate said second major surface; and
   wherein at least one of said edge surfaces includes a projecting portion defining a first engagement plane and a recessed portion spaced inwardly of the engagement plane whereby the grinding wheel is engageable with said projecting portion without engaging said recessed portion.

2. The tool insert blank of claim 1 wherein said second layer defines said second major surface and said second portion of said plurality of edge surfaces proximate said second major surface.

3. The tool insert blank of claim 1 wherein each of said plurality of edge surfaces includes a projecting portion defining an engagement plane and a recessed portion spaced inwardly of the respective engagement plane.

4. The tool insert blank of claim 3 wherein each of said edge surfaces includes a first projecting portion at one end, a second projecting portion at an opposite end and a recessed portion disposed between said first and second projecting portions.

5. The tool insert blank of claim 4 wherein said plurality of edge surfaces includes at least three edge surfaces.

6. The tool insert blank of claim 1 wherein said second layer comprises a polycrystalline diamond material.

7. The tool insert blank of claim 1 wherein said projecting portion is disposed at a substantially perpendicular angle with respect to said first and second major surfaces.

8. The tool insert blank of claim 1 wherein said projecting portion is disposed at a non-perpendicular angle with respect to said first and second major surfaces.

9. A method of forming a tool insert blank, said method comprising:
   providing a multi-layered body having first and second major surfaces defining opposing sides of the body, the body includes a first layer defining the first major surface and a second layer harder than the first layer;
   cutting a tool insert blank from the body wherein the resulting blank has a first side defined by the first major surface, a second side defined by the second major surface and a second layer portion that is substantially co-extensive with the second side, the tool insert blank further including a plurality of edge surfaces extending between the first and second sides of the blank wherein the plurality of edge surfaces define an outer perimeter of the tool blank and at least one of the edge surfaces includes a projecting portion defining a first engagement plane and a recessed portion spaced inwardly of the engagement plane whereby a grinding wheel is engageable with the projecting portion without engaging the recessed portion.

10. The method of claim 9 wherein the step of cutting a tool insert blank from the body is repeated to thereby cut a plurality of tool insert blanks from the body.

11. The method of claim 9 wherein the body is a previously used tool insert.

12. The method of claim 9 wherein the second layer defines the second major surface.

13. The method of claim 9 wherein each of said plurality of edges includes a first projecting portion at one end, a second projecting portion at an opposite end and a recessed portion disposed between said first and second projecting portions.

14. The method of claim 9 wherein the second layer comprises a polycrystalline diamond material.

15. The method of claim 9 wherein the step of cutting a tool insert blank from the body is performed using a wire electrical discharge machining process.

16. The method of claim 9 wherein the edge surfaces are disposed at a substantially perpendicular angle to the first and second major surfaces.

17. The method of claim 9 wherein the projecting portion defines a non-perpendicular angle with the first and second major surfaces.

18. The method of claim 17 wherein the step of cutting a tool insert blank from the body is performed using a wire electrical discharge machining process.

19. A method of forming a tool insert blank, said method comprising:
    providing a multi-layered body having first and second major surfaces defining opposing sides of the body, the body includes a first layer defining the first major surface and a second layer harder than the first layer;
    cutting a tool insert blank from the body wherein the resulting blank has a first side defined by the first major surface, a second side defined by the second major surface and a plurality of edge surfaces extending between the first and second sides of the blank, the plurality of edge surfaces define an outer perimeter of the tool blank and at least one of the edge surfaces includes a projecting portion defining a first engagement plane and a recessed portion spaced inwardly of the engagement plane whereby a grinding wheel is engageable with the projecting portion without engaging the recessed portion; and
    wherein cutting the recessed portion includes removing a portion of the second layer.

20. The method of claim 19 wherein the step of cutting a tool insert blank from the body is performed using a wire electrical discharge machining process.

* * * * *